United States Patent
Herrell

(10) Patent No.: US 8,006,103 B2
(45) Date of Patent: Aug. 23, 2011

(54) TPM DEVICE FOR MULTI-PROCESSOR SYSTEMS

(75) Inventor: Russ W. Herrell, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 970 days.

(21) Appl. No.: 11/924,889

(22) Filed: Oct. 26, 2007

(65) Prior Publication Data

US 2009/0113171 A1    Apr. 30, 2009

(51) Int. Cl.
*H04L 9/32* (2006.01)
*H04L 9/00* (2006.01)
*G06F 7/04* (2006.01)

(52) U.S. Cl. .......... 713/194; 713/192; 713/193; 726/27; 726/28; 726/29; 726/30

(58) Field of Classification Search ................... 713/194
See application file for complete search history.

(56) References Cited

U.S. PATENT DOCUMENTS

2008/0060068 A1 * 3/2008 Mabayoje et al. ................ 726/9

* cited by examiner

*Primary Examiner* — Longbit Chai

(57) ABSTRACT

In one embodiment, a computer system comprises at least a first computing cell and a second computing cell, each computing cell comprising at least one processor, at least one programmable trusted platform management device coupled to the processor via a hardware path which goes through at least one trusted platform management device controller which manages operations of the at least one programmable trusted platform device, and a routing device to couple the first and second computing cells.

17 Claims, 5 Drawing Sheets

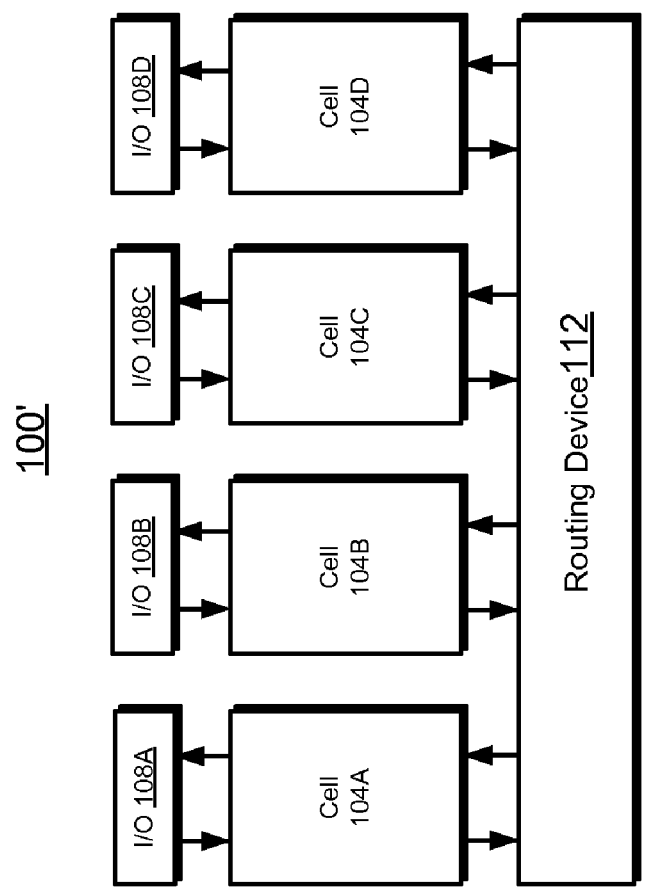
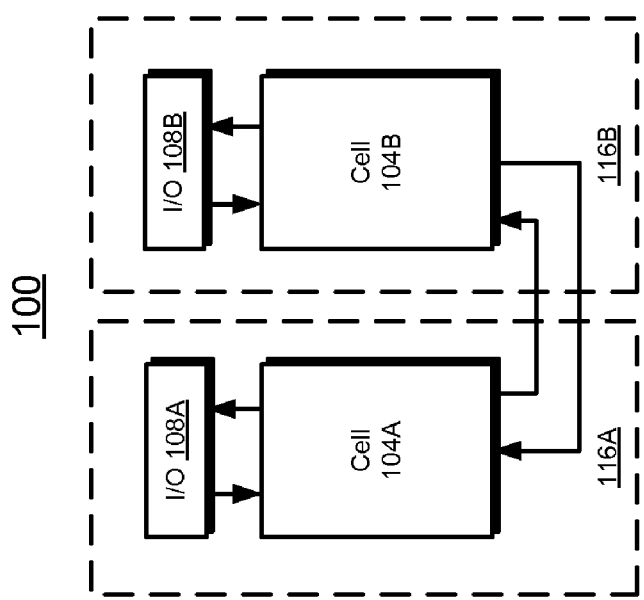
Fig. 1B
Fig. 1A

TPM DEVICE FOR MULTI-PROCESSOR SYSTEMS

BACKGROUND

This application relates to electronic computing and more particularly to a trusted platform module (TPM) device for multi-processor systems.

High performance computer systems may utilize multiple processors to increase processing power. Processing workloads may be divided and distributed among the processors, thereby reducing execution time and increasing performance. One architectural model for high performance multiple processor system is the cache coherent Non-Uniform Memory Access (ccNUMA) model. Under the ccNUMA model, system resources such as processors and random access memory may be segmented into groups referred to as Locality Domains, also referred to as "nodes" or "cells". Each node may comprise one or more processors and physical memory. A processor in a node may access the memory in its node, referred to as local memory, as well as memory in other nodes, referred to as remote memory.

Multi-processor computer systems may be partitioned into a number of elements, or cells. Each cell includes at least one, and more commonly a plurality, of processors. Partitioned computer systems provide a high degree of flexibility in allocating the computing power of a computer system. For example, the various cells in a partitioned computer system, and even various processors within cells, may run different operating systems, if desired. Security and reliability concerns may create a need to isolate resources in one partition from accesses to/from another partition. Such isolation tends to physically subdivide the computer system into 'hardened' partitions.

Moreover, computing resources such as entire cells or even individual processors and memory within a cell may be reassigned between partitions in response to changing demands for computing resources. Such reassignment may be performed by a network administrator, or may be performed dynamically by a resource manager module that executes on the computer system.

Recent trusted personal computer architectures incorporate a trusted platform module (TPM) that offers various services useful for data protection. TPMs may be implemented as an application specific integrated circuit (ASIC) that utilize hardware and software platform configuration information to provide encryption and data security services. Because TPM devices rely on hardware and software configuration information specific to a computing device, resource reallocation operations in partitioned computer systems raise technical issues in implementing TPMs in a partitioned computer system environment.

Examples of such technical issues are purging of TPM state when the hosting hardware is retargeted to another purpose, migration of appropriate TPM state when an OS and its workload are migrated to different hosting hardware, or recovery of TPM state when the hosting hardware fails and is replaced.

BRIEF DESCRIPTION OF THE DRAWINGS

FIGS. 1A, 1B and 1C are schematic illustrations of one embodiment of a multiprocessor computer system according to embodiments.

DETAILED DESCRIPTION

Described herein are exemplary systems and methods for utilizing trusted platform module (TPM) devices in multi-processor systems. The methods described herein may be embodied as logic instructions on a computer-readable medium. When executed on one or more processor(s), the logic instructions cause the processor(s) to be programmed as a special-purpose machine that implements the described methods. The processor(s), when configured by the logic instructions to execute the methods recited herein, constitutes structure for performing the described methods.

Figure 1C:
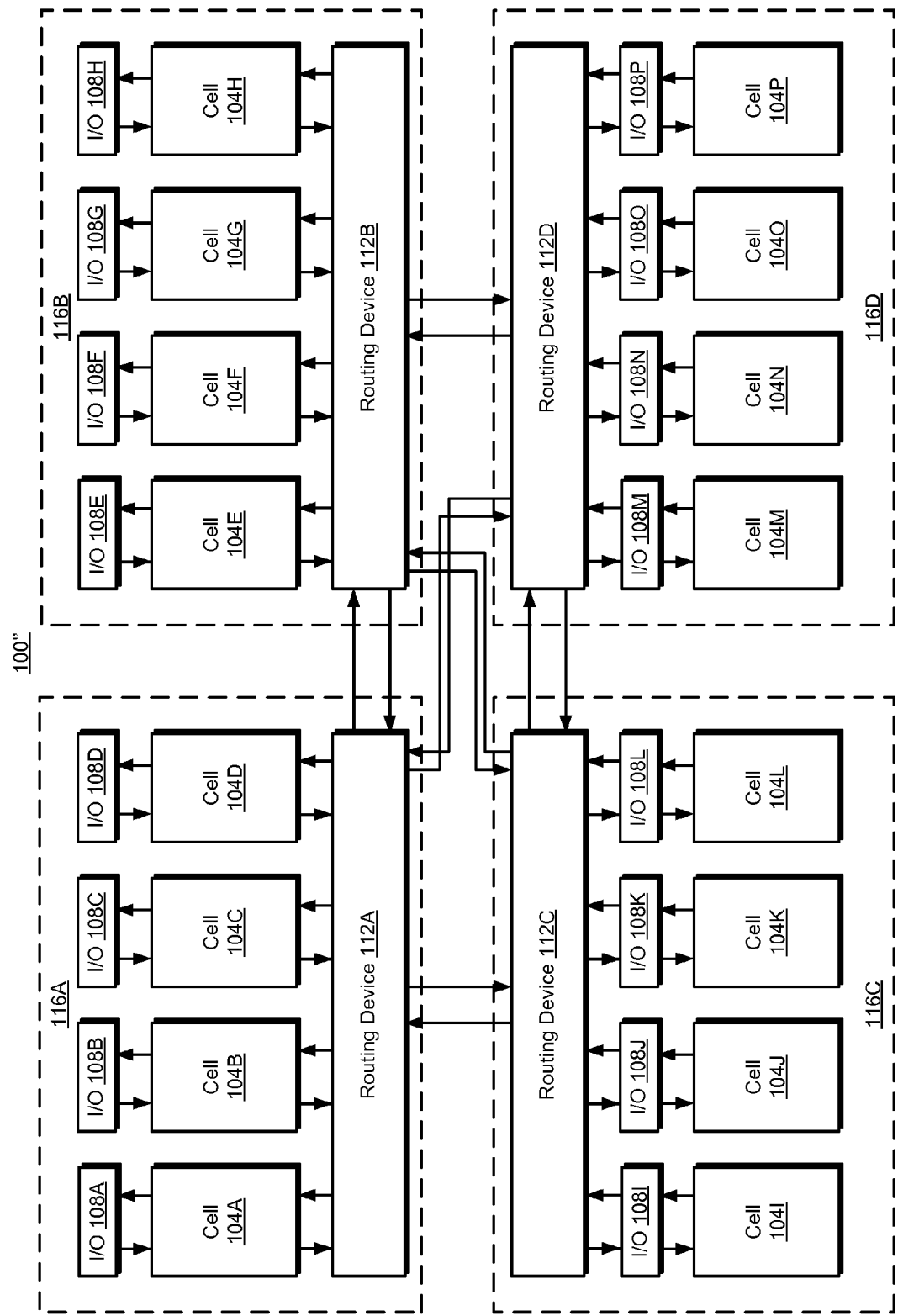

With reference to FIGS. 1A, 1B, and 1C, a partitionable computer system 100 can include a number of elements or cells 104. In FIG. 1A, only two cells 104A and 104B are present. However, more than two cells 104 can create the partitionable computer system 100. For example, FIG. 1B depicts a partitionable computer system 100' having four cells 104A, 104B, 104C, and 104D. In FIG. 1C, sixteen cells 104A, 104B, 104C, 104D, 104E, . . . 104P, create the partitionable computer system 100". Each cell 104 can communicate with a respective input and output module 108, which is used to provide input to the system 100 and output from the system 100.

In partitionable computer systems having more than two cells 104, for example systems 100' and 100" shown in FIGS. 1B and 1C, respectively, the cells 104 can communicate with each other through a routing device 112. The routing device can be a crossbar switch or other similar device that can route data packets. For example, a NUMAflex 8-Port Router Interconnect Module sold by SGI of Mountain View, Calif. can be used. The routing device 112 facilitates the transfer of packets from a source address to a destination address. For example, if cell 104A sends a packet to cell 104D, cell 104A sends the packet to the routing device 112, the routing device 112 in turn, transmits the packet to cell 104D.

In a larger partitionable computer system, such as the system 100" shown in FIG. 1C, there can be more than one routing device 112. For example, there can be four routing devices 112A, 112B, 112C, and 112D. The routing devices 112 collectively can be referred to as the switch fabric. The routing devices 112 can communicate with each other and a number of cells 104. For example, cell 104A, cell 104B, cell 104C and cell 104D can communicate directly with routing device 112A. Cell 104E, cell 104F, cell 104G, and cell 104H can communicate directly with routing device 112B. Cell 104I, cell 104J, cell 104K, and cell 104L can communicate directly with routing device 112C. Cell 104M, cell 104N, cell 104O, and cell 104P can communicate directly with routing device 112D. In such a configuration, each routing device 112 and the cells 104 that the routing device 112 directly communicates with can be considered a partition 116. As shown, in FIG. 1C there are four partitions 116A, 116B, 116C and 116D. As shown, each partition includes four cells, however; any number of cells and combination of cells can be used to create a partition. For example, partitions 116A and 116B can be combined to form one partition having eight cells. In one embodiment, each cell 104 is a partition 116. As shown in FIG. 1A, cell 104 can be a partition 116A and cell 104B can be a partition 116B. Although the embodiment depicted in FIG. 1C has four cells, other embodiment may have more or fewer cells.

Each partition can be dedicated to perform a specific computing function. For example, partition 116A can be dedicated to providing web pages by functioning as a web server farm and partition 116B can be configured to provide diagnostic capabilities. In addition, a partition can be dedicated to maintaining a database. In one embodiment, a commercial data center can have three tiers of partitions, the access tier (e.g., a web farm), application tier (i.e., a tier that takes web requests and turns them into database queries and then responds to the web request) and a database tier that tracks various action and items.

Figure 1D:
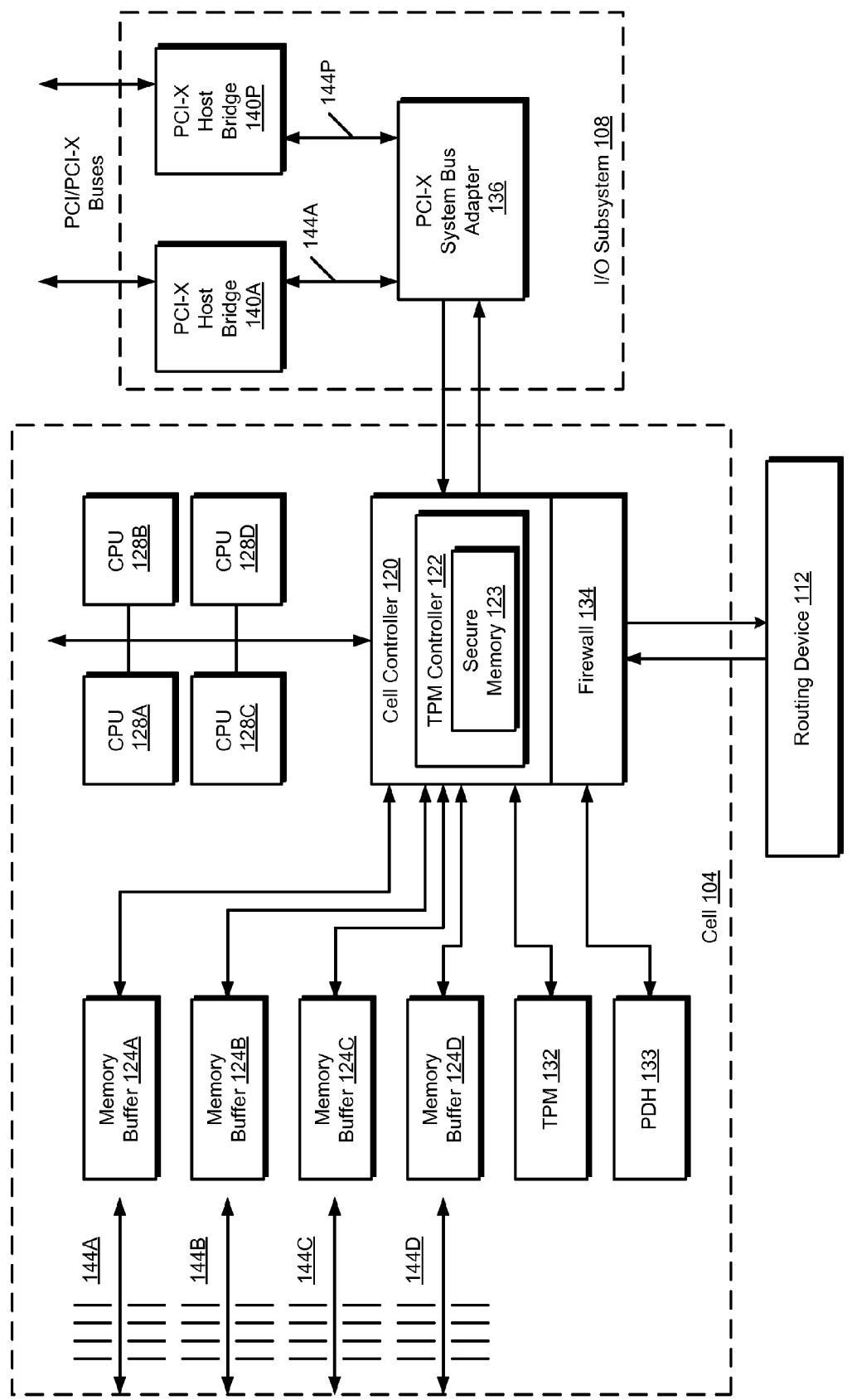
FIG. 1D is a block diagram of a cell, such as the cell depicted in FIG. 1B, according to some embodiments.

With reference to FIG. 1D, each cell 104 includes a cell controller 120, a plurality of memory buffers 124A, 124B, 124C, 124D (referred to generally as memory buffers 124), one or more central processing units (CPUs) 128A, 128B (referred to generally as CPUs 128 or processors 128), a TPM 132, a Platform Dependent Hardware (PDH) blocks 133, and a firewall 134. The term CPU is not intended to be limited to a microprocessor, instead it is intended to be used to refer to any device that is capable of processing. The memory buffers 124, CPUs 128, and TPM 132 each communicate with the cell controller 120. When the cell 104 is in communication with a crossbar 112, the cell controller 120 is also in communication with the crossbar 112. The cell controller 120 is also in communication with the I/O subsystem 108.

In some embodiments, cell controller 120 comprises a trusted platform module controller 122, which in turn comprises a memory module 123. The TPM controller 122 and a secure memory 123 may be integrated within the cell controller 120, or may be an adjunct controller coupled to the cell controller 120. The cell controller 120 and TPM controller 122, as well as a discrete TPM 132 can be any kind of processor including, for example, a conventional processor, or a field programmable gate array (FPGA). The cell controller 120 may include a communications bus (not shown) that is used to route signals between the TPM 132, the CPUs 128, the memory buffers 124, the routing device 112 and the I/O subsystem 108. The cell controller 120 also performs logic operations such as mapping main memory requests into memory DIMM requests to access and return data and perform cache coherency functions for main memory requests so that the CPU and I/O caches are always consistent and never stale.

In one embodiment, the I/O subsystem 108 include a bus adapter 136 and a plurality of host bridges 140. The bus adapter 136 communicates with the host bridges 140 through a plurality of communication links 144. Each link 144 connects one host bridge 140 to the bus adapter 136. As an example, the bus adapter 136 can be a peripheral component interconnect (PCI) bus adapter. The I/O subsystem can include sixteen host bridges 140A, 140B, 140C, . . . , 140P and sixteen communication links 144A, 144B, 144C, . . . , 144P.

As shown, the cell 104 includes fours CPUs 128, however; each cell includes various numbers of processing units 128. In one embodiment, the CPUs are ITANIUM based CPUs, which are manufactured by Intel of Santa Clara, Calif. Alternatively, SUN UltraSparc processors, IBM power processors, Intel Pentium processors, or other processors could be used. The memory buffers 124 communicate with eight synchronous dynamic random access memory (SDRAM) dual in line memory modules (DIMMs) 144, although other types of memory can be used.

Although shown as a specific configuration, a cell 104 is not limited to such a configuration. For example, the I/O subsystem 108 can be in communication with routing device 112. Similarly, the DIMM modules 144 can be in communication with the routing device 112. The configuration of the components of FIG. 1D is not intended to be limited in any way by the description provided.

In some embodiments, a multiprocessor computer system such as the computer system depicted in FIGS. 1A-1D may utilize a trusted platform module controller 122 and a secure memory module 123 as a surrogate TPM, or in combination with an actual TPM 132. Including a secure memory and a custom TPM controller in the implementation of the TPM programming model presented to the CPU enables trusted platform module data to be portable between cells in a multiprocessor computer system. For example, in some circumstances hardware and/or software resources may need to be shifted between cells, or partitions, in a multiprocessor computer system. Accordingly, trusted platform module data associated with the cell may need to be migrated from a first cell's secure memory module to a second cell's secure memory module in the computer system.

Figure 2:
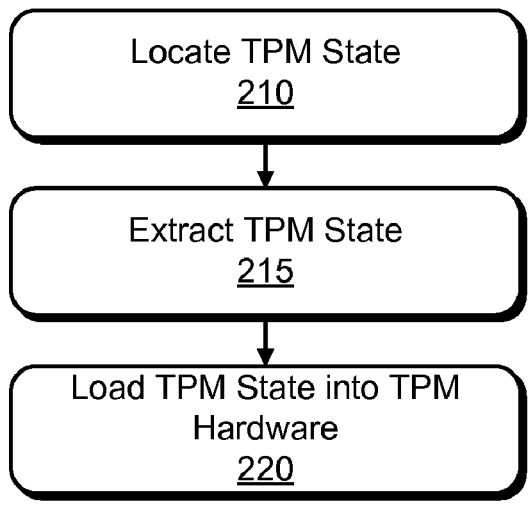
FIG. 2 is a flowchart illustrating operations associated with a partition boot in a multiprocessor computer system, according to some embodiments.

FIG. 2 is a flowchart illustrating operations associated with a partition boot in a multiprocessor computer system, according to some embodiments. In some embodiments, the operations depicted in FIG. 2 may be implemented by a controller such as, for example the trusted platform module controller 122 depicted in FIG. 1D. When a partition boots an OS, trusted platform module data associated with the partition is made available to the partition's OS. The trusted platform module data may be stored in a memory location integrated with or coupled to the trusted platform module controller 122, as for example in secure memory 123. When the partition is booted, the trusted platform controller 122 locates trusted platform module state information for the partition (operation 210). At operation 215 the trusted platform module controller 122 extracts trusted platform module state data from the secure memory location 123. At operation 220, the trusted platform module controller 122 loads the trusted platform module state data into the hardware presenting the TPM programming model to the operating system of the partition.

Figure 3:
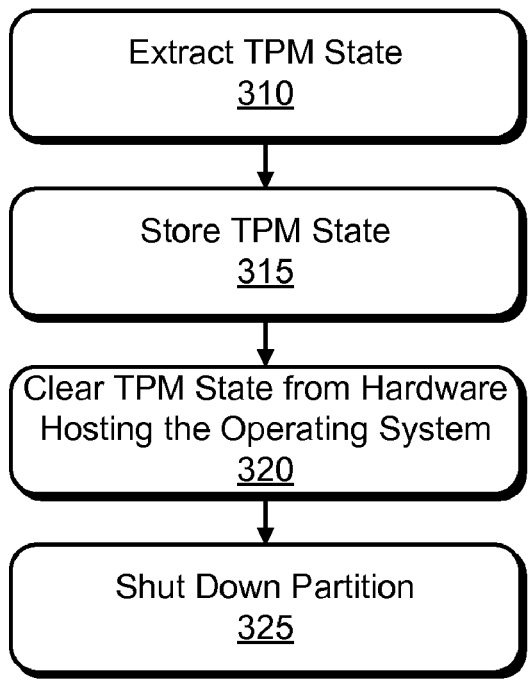
FIG. 3 is a flowchart illustrating operations associated with a partition shut down in a multiprocessor computer system, according to embodiments.

The partition can operate normally using the trusted platform module data provided during the boot operation for operations such as encryption, security, and the like. In the event that the partition needs to be shut down the trusted platform module data may be stored in a secure memory module for subsequent use. FIG. 3 is a flowchart illustrating operations associated with a partition shut down in a multiprocessor computer system, according to embodiments. In some embodiments, the operations depicted in FIG. 2 may be implemented by a controller such as, for example the trusted platform module controller 122 depicted in FIG. 1D. Referring to FIG. 3, at operation 310 trusted platform module state data is extracted from a memory location integrated with or coupled to trusted platform module controller 122. At operation 315 the trusted platform module state data is stored in a persistent memory location, for example, the memory module 123. At operation 320 the trusted platform module state data used during the partition operation is cleaned, or deleted. At operation 325, the partition may be shut down. Therefore, when the partition is rebooted the trusted platform module state is clear, yet is stored in a secure memory location such that it can be retrieved if desired.

Figure 4:
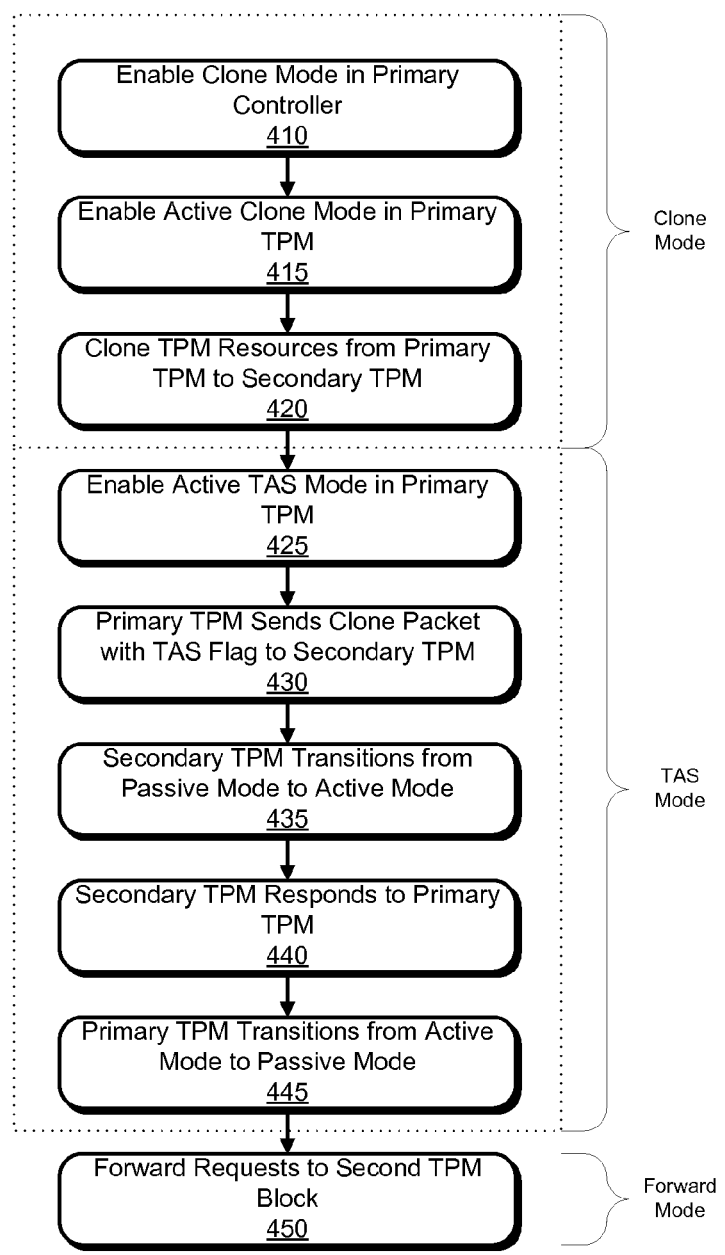
FIG. 4 is a flowchart illustrating operations in a method of migrating trusted platform management data online from a first cell to a second cell in a multiprocessor computer system, according to embodiments.

In some embodiments it may be useful to migrate trusted platform module data from a first cell in the computer system to a second cell in the computer system while an OS is online (i.e., running and using said TPM resources). FIG. 4 is a flowchart illustrating operations in a method of migrating trusted platform management data from a first cell to a second cell in a multiprocessor computer system, according to embodiments. In the embodiment depicted in FIG. 4, trusted platform module data may be migrated as part of migration operations in which TPM resources found on a primary TPM block of a first cell, namely, the TPM block of a first cell are migrated to a TPM block of a second cell, referred to as a secondary TPM block.

As illustrated in FIG. 4 and further set forth in Table 1 below, the overall TPM migration process can be understood to encompass first, second and third modes. As shown, these first, second and third modes can be referred to as a clone mode, a transfer of active status (TAS) mode, and a forward mode. In general, during the clone mode, a primary objective is to build a duplicate of the critical resources of the primary TPM block in the secondary (target) TPM block. During the TAS mode, the primary TPM block is decommissioned from the partition in favor of the secondary TPM block. Then, after operation in the TAS mode, operation in the forward mode occurs in which the primary TPM block is disabled and all requests are handled directly by the secondary TPM.

Referring to FIG. 4, operations 410 to 420 are performed by the computer system when in the clone mode. More particularly, at operation 410 the clone is enabled within in the first cell such that the system mode changes from the normal mode to the clone mode. When the cell 16 enters the clone mode, it becomes possible to clone the primary TPM block from a first cell to a second cell (e.g., to copy the critical resources of a primary TPM block to a secondary TPM block). At operation 415, the primary TPM block is placed in an active clone mode.

When in the active clone mode, the primary TPM block actively participates in migrating the critical resources available at the primary TPM block to the secondary TPM block, while at the same time also tracking the state of the operating system. During this time, it is still the primary TPM block that makes the decisions, on a resource-by-resource (and possibly partition-by-partition) basis, as to what action should be taken in response to any given request to the TPM block. It should further be noted that throughout the operation of the system in the clone, the secondary TPM block remains in a passive mode such that it does not respond to requests, albeit it is able to receive information by which the critical resources of the primary TPM block are cloned to the secondary TPM block.

At operation 420 the critical resources of the primary TPM block are cloned to the secondary TPM. In some embodiments, request packets from the CPU of the primary controller arrive at the primary TPM block. As the request packets arrive at the primary TPM block, the TPM block determines the proper data/address update for cloning to the secondary TPM block and then sends a clone of the requested packet via the routing device 112 to the secondary TPM block. Once the clone packet reaches the secondary TPM block that block performs the clone. Finally, after the cloning has occurred, the secondary TPM block then sends a response back to the primary TPM block, which in turn sends a response to the requesting CPU such that the access is retired.

During the cloning process of operation 420, the primary TPM block mirrors accesses it receives from the CPU to the secondary TPM block in order to keep the secondary TPM block current with the first TPM block. In general, for TPM read/write requests from a CPU, the data is first read in the primary TPM and then written to the secondary TPM, all before the CPU is released to perform another transaction. This effectively clones the information from one TPM to another. In the embodiment, it is also possible to affect a complete clone of the entire primary TPM block by traversing all the primary TPM addresses and performing a clone mode read operation. In this manner, the data is updated both in the primary and secondary TPM blocks, respectively, effectively keeping the data between the primary and the secondary in synchronization, and coherent, when the operating system or other fabric-based writes attempt to update resources.

When all resources from the primary TPM block have been migrated to the secondary TPM block, the computer system then switches to the TAS mode. Operation in this mode generally involves transitioning from operating the primary TPM block in an active manner to operating the secondary TPM block in an active manner. More particularly at operation 425 the active TAS mode is enabled within the primary TPM block, such that the overall system mode changes from the clone mode to a part of the TAS mode. When the primary TPM block is operating in the active TAS mode, the primary TPM block is no longer responsible for tracking the OS state.

At operation 430 the CPU generates a signal that is provided to the primary TPM block. In some embodiments the signal may be implemented as a load or store directed to a specific address associated with the targeted TPM resource. Upon receiving this signal, the primary TPM block initiates a transfer of active status from itself to the secondary TPM block by sending a clone of the received signal to the secondary TPM block. In doing this, the primary TPM block acts as though it were operating in the active clone mode except insofar as the primary TPM block attaches an additional TAS flag to the clone signal sent to the secondary TPM block. Upon receiving the clone signal with the TAS flag at the secondary TPM block, the secondary TPM block transitions from passive status to active status (operation 435). As part of this transition, the secondary TPM block updates its resources and begins tracking the operating system state.

At operation 440 the secondary TPM block responds back to the primary TPM block after fulfilling the clone request and transitioning to its active mode. Upon the response arriving at the primary TPM block, the primary TPM block then changes from its active (active TAS) mode to a passive-forward mode (operation 445). After this has occurred, the primary TPM block sends a response to the requesting CPU 10 such that the access is retired, and the primary TPM block does not thereafter actively participate in the operations of the partition or track the OS state.

Although the above discussion describes the communications between the primary and secondary TPM blocks as single signals, each communication may be readily understood to be some number of discrete signals which pass between the two TPM blocks as required by the embodiment. Also, it should be mentioned that the operating system may be unaware of the transitions occurring at the TPM blocks during the clone and TAS modes. In some embodiments, signals that trigger cloning or TAS operations between TPM blocks may be initiated by migration firmware running outside the context and comprehension of the OS, possibly running on processors not under OS control.

At operation 450 access signals that would have previously been directed to the first TPM block are forwarded to the secondary TPM block rather than to the primary TPM block. Responses from the secondary TPM block also proceed in a reverse manner back to the CPU.

The operations depicted in FIGS. 2-4 enable a partitioned computer system such as the systems depicted in FIGS.

1A-1D to migrate trusted platform module data from a first partition to a second partition in a secure manner, either before boot, or during OS runtime. Thus, the computer system may implement trusted platform operations on multiple, independent operating systems.

Embodiments described herein may be implemented as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Additionally, some embodiments discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment is included in at least one implementation. The appearances of the phrase "in one embodiment" in various places in the specification are not necessarily all referring to the same embodiment.

What is claimed is:

1. A partitionable multi-processor computer system comprising:
   a cell architecture comprising at least a first computing cell and a second computing cell, each computing cell comprising:
   at least one processor;
   a cell controller in communication with an I/O subsystem;
   at least one programmable trusted platform management device coupled to the at least one processor via a hardware path which goes through at least one trusted platform management device controller in the partitionable multi-processor computer system; and
   a persistent memory module to store trusted platform state data for a corresponding operating system partition extracted from the at least one programmable trusted platform management device, wherein the at least one trusted platform management device controller and the persistent memory module are configured to transfer said state data from the at least one programmable trusted platform management device to another programmable trusted platform management device; and
   a routing device to couple the first and second computing cells.

2. The computer system of claim 1, further comprising at least one microcontroller coupled to the at least one programmable trusted platform management device.

3. The computer system of claim 1, wherein the at least one trusted platform management device controller comprises the persistent memory module, wherein the persistent memory module is secure against direct access by a central processing unit (CPU) of a partition.

4. The computer system of claim 1, wherein at least one programmable trusted platform management device is implemented in a field programmable gate array.

5. The computer system of claim 1, wherein at least one trusted platform management device controller is integrated with the cell controller.

6. The computer system of claim 1, wherein at least one trusted platform management device controller is implemented as a chipset coupled to the cell controller.

7. The computer system of claim 1, wherein the at least one trusted platform management device maintains the state data relating to the at least one trusted platform management device.

8. The computer system of claim 1, wherein:
   the at least one programmable trusted platform management device comprises a first trusted platform management device comprising state data for the first trusted platform management device generated from a first partition in the computer system; and
   the computer system is configured to migrate the state data to a second partition, different from the first partition, in the computer system.

9. The computer system of claim 1, wherein the at least one processor comprises at least one central processing unit (CPU).

10. A cell for a partitionable multi-processor computer system that provides a cell architecture comprising at least a first computing cell and a second computing cell, the cell comprising:
    at least one processor;
    a cell controller in communication with an I/O subsystem;
    at least one programmable trusted platform management device coupled to the at least one processor via a hardware path which goes through at least one trusted platform management device controller in the partitionable multi-processor computer system;
    the at least one trusted platform management device controller to manage operations of the at least one programmable trusted platform device; and
    a persistent memory module to store trusted platform state data for a corresponding operating system partition extracted from the at least one programmable trusted platform management device, wherein the at least one trusted platform management device controller and the persistent memory module are configured to transfer said state data from the at least one programmable trusted platform management device to another programmable trusted platform management device; and
    a routing device to couple the first and second computing cells.

11. The cell of claim 10, further comprising at least one microcontroller coupled to the at least one programmable trusted platform management device.

12. The cell of claim 10, wherein the at least one trusted platform management device controller comprises the persistent memory module.

13. The cell of claim 10, wherein at least one programmable trusted platform management device is implemented in a field programmable gate array.

14. The cell of claim 10, wherein at least one trusted platform management device controller is integrated with the cell controller.

15. The cell of claim 10, wherein at least one trusted platform management device controller is implemented as a chipset coupled to the cell controller.

16. The cell of claim 10, wherein the at least one trusted platform management device maintains the state data relating to the at least one trusted platform management device.

17. The cell of claim 10, wherein the at least one processor comprises at least one central processing unit (CPU).

* * * * *